US009264691B2

(12) United States Patent
Zou et al.

(10) Patent No.: US 9,264,691 B2
(45) Date of Patent: Feb. 16, 2016

(54) METHOD AND SYSTEM FOR BACKWARD 3D-VIEW SYNTHESIS PREDICTION USING NEIGHBORING BLOCKS

(71) Applicant: Mitsubishi Electric Research Laboratories, Inc., Cambridge, MA (US)

(72) Inventors: Feng Zou, Cambridge, MA (US); Dong Tian, Boxborough, MA (US); Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 528 days.

(21) Appl. No.: 13/631,852

(22) Filed: Sep. 28, 2012

(65) Prior Publication Data
US 2014/0092208 A1   Apr. 3, 2014

(51) Int. Cl.
*H04N 19/583* (2014.01)
*H04N 13/00* (2006.01)
*H04N 19/597* (2014.01)

(52) U.S. Cl.
CPC ....... *H04N 13/0048* (2013.01); *H04N 13/0011* (2013.01); *H04N 19/597* (2014.11)

(58) Field of Classification Search
CPC . H04N 19/597; H04N 13/00; H04N 13/0007; H04N 13/0048
USPC ............................................ 348/43; 375/240
See application file for complete search history.

(56) References Cited

U.S. PATENT DOCUMENTS

2006/0146138 A1*  7/2006  Xin et al. ............. H04N 19/597
                                                   348/207.99
2008/0031327 A1*  2/2008  Wang et al. ............... 375/240.12
2012/0269270 A1*  10/2012  Chen et al. ............... 375/240.16

OTHER PUBLICATIONS

R-P. M Berretty, A.K. Riemens and P.F. Machado, "Real-time embedded system for stereo video processing for multiview displays",SPIE vol. 6490, 649014, © 2007 SPIE-IS&T • 0277-786X/07.*
Emin Martinian, Alexander Behrens, Jun Xin, Anthony Vetro, "View Synthesis for Multiview Video Compression", Mitsubishi Electric Research Laboratories,http://www.merl.com, TR2006-035 May 2006, Picture Coding Symposium—2006.*
Wang, Hung-Ming, Chun-Hao Huang, and Jar-Ferr Yang. "Block-based depth maps interpolation for efficient multiview content generation." Circuits and Systems for Video Technology, IEEE Transactions on 21.12 (2011): 1847-1858.*
Martinian, Emin, et al. "View synthesis for multiview video compression." Picture Coding Symposium. vol. 37. 2006.*
Benjamin Bross et al. "High Efficiency Vido Coding (HEVC) Text Specification draft 8", JCT-VC, Doc. JCTVC-H1003-d7, p. 84-85 and p. 110-123. 10th Meeting Stockholm, SE, Jul. 2012.

* cited by examiner

*Primary Examiner* — Sath V Perungavoor
*Assistant Examiner* — Clifford Hilaire
(74) *Attorney, Agent, or Firm* — Dirk Brinkman; Gene Vinokur

(57) ABSTRACT

Videos of a scene are processed for view synthesis. The videos are acquired by corresponding cameras arranged so that a view of each camera overlaps with the view of at least one other camera. For each current block, motion or disparity vector is obtained from neighboring blocks. A depth block is based on a corresponding reference depth image and the motion or disparity vector. A prediction block is generated based on the depth block using backward warping. Then, predictive coding for the current block using the prediction block.

17 Claims, 11 Drawing Sheets

METHOD AND SYSTEM FOR BACKWARD 3D-VIEW SYNTHESIS PREDICTION USING NEIGHBORING BLOCKS

FIELD OF THE INVENTION

This invention relates generally to coding multiview videos, and more particularly to coding 3D multiview videos for predictive compression.

BACKGROUND OF THE INVENTION

Multiview video coding is essential for applications such as three dimensional television (3DTV), free viewpoint television (FTV), and multi-camera surveillance. Multiview video coding is also known as dynamic light field compression. As used herein, coding can include encoding, decoding or both in a codec, for example.

Depth images are assumed part of the data format in an emerging 3D video coding standard. Using the depth images as side information to perform predictive coding is known as view synthesis prediction (VSP).

In conventional video coding, e.g., coding according to the H.264 AVC (Advanced Video Coding) and H.265 HEVC (High Efficiency Video Coding) standards, motion information from neighboring blocks is used to derive a motion vector. The derived motion vector is then used as a motion vector predictor (MVP) to predict the motion vector for the current block. Then, the motion vector difference (MVD) between the current motion vector and the MVP is encoded and transmitted.

FIG. 1 shows a conventional method to code a current block. Step 110 derives a motion or disparity vector from a neighboring block, referred to as MotionDerive. Step 120 determines a motion or disparity vector, referred to as MotionCurrent, for the current block by applying motion estimation techniques that aim to minimize residual differences. Step 130 calculates and codes the motion vector difference: (MotionDiff=MotionCurrent−MotionDerive). Finally, step 140 codes the residual block.

FIG. 2 shows the corresponding prior-art encoder. Element 201 shows blocks in a portion of a picture. In element 201, a current block is denoted by a star "*", and a neighboring block is denoted by a dot "•". From the neighboring blocks as shown in element 201, derive 202 a motion vector or disparity vector. The derived motion or disparity vector from 202 serves as motion vector predictor (MVP) 203.

By referencing the texture reference picture buffer 204, motion estimation is performed 205 for the current block to produce a motion vector (MotionCurrent) 206 for the current block.

After calculating 207 the difference between MVP and MotionCurrent, a motion vector difference (MVD) 208 is obtained, which is encoded 209 into the bitstream 210.

Another output from motion estimation 205 is the reference picture, which serves as texture predictor 211. Then, the texture residual 211 is obtained by performing 212 texture prediction based on the texture predictor 211 and the current picture 215. The texture residual 213 is also encoded 214 as part of the bitstream.

FIG. 3 shows the decoder. From the neighboring blocks as shown in element 301, derive 302 a motion vector or disparity vector. The derived motion or disparity vector serves as the motion vector predictor (MVP) 303.

From the coded bitstream 310, motion vector difference (MVD) 308 is decoded 309 and fed to an adder 307. The motion vector predictor 303 and motion vector difference 308 are added 307, and the motion vector used for the current block MotionCurrent 306 is then obtained.

From the coded bitstream 310, the texture residual picture 313 is decoded 314. The current motion vector 306 and the texture residual picture are inputs to the motion compensation module 305. Together with texture reference buffer 304, the motion compensation is performed, and finally the decoded picture is outputted 315.

SUMMARY OF THE INVENTION

A method and system for performing view synthesis prediction (VSP) by using backward warping for texture-coding, where a depth component is coded after a texture component.

Conventional, forward warping based view synthesis prediction typically uses the texture and depth components from a reference view. Although forward warping normally provides a high fidelity, a major disadvantage of forward warping based VSP is a significant increase in the complexity of the codec.

In contrast, backward warping based view synthesis prediction (B-VSP), as disclosed herein, is less complex. Therefore, backward warping based VSP is desired at certain applications. In addition, backward warping, based VSP facilitates block based VSP reference generation.

Unfortunately, backward warping based VSP normally requires depth-first coding. That is, the depth component is coded before the corresponding texture component from the same access unit. An access unit is a collection of all the components (texture and depth) at a same time instant. Depth-first coding prevents the use of any depth coding tools that need to access the corresponding texture component.

To exploit the advantages of backward warping based VSP, while avoiding the depth-first coding, the embodiments use a motion or disparity vector from neighboring blocks to derive a depth block from previously coded depth images, such as those depth images coded in the previous access unit, or the same access unit but from other viewpoints. Hence, the derived depth block is assumed as an estimated depth block for the current block to be coded, which is finally used for backward warping based VSP.

DETAILED DESCRIPTION OF THE EMBODIMENTS OF THE INVENTION

The embodiments of our invention provide a method and system for generating a view synthesis prediction (VSP) reference picture based on a backward warping technique. The method does not use depth-first coding. The method uses motion or disparity information from neighboring blocks to a current to derive a depth block for the current block, to be coded. Then, the derived depth block is used to perform backward warping. As used herein, view synthesis generates a synthetic video from one or more videos of a scene, in which each video of a 3D scene is acquired by a corresponding camera arranged at a particular pose, and in which a view of each camera overlaps with the view of at least one other camera.

Compared to conventional view synthesis that uses the motion information from neighboring blocks, the embodiments are characterized in deriving a depth block and forming a sample block to predict the current block based on a derived depth block.

The embodiments disclose different ways to use the motion or disparity information from the neighboring blocks. Specifically, the derived motion or disparity information is directly used to derive a depth block, DepthDerive, which is further used to form a predictor for the sample values in the current block.

Figure 1:
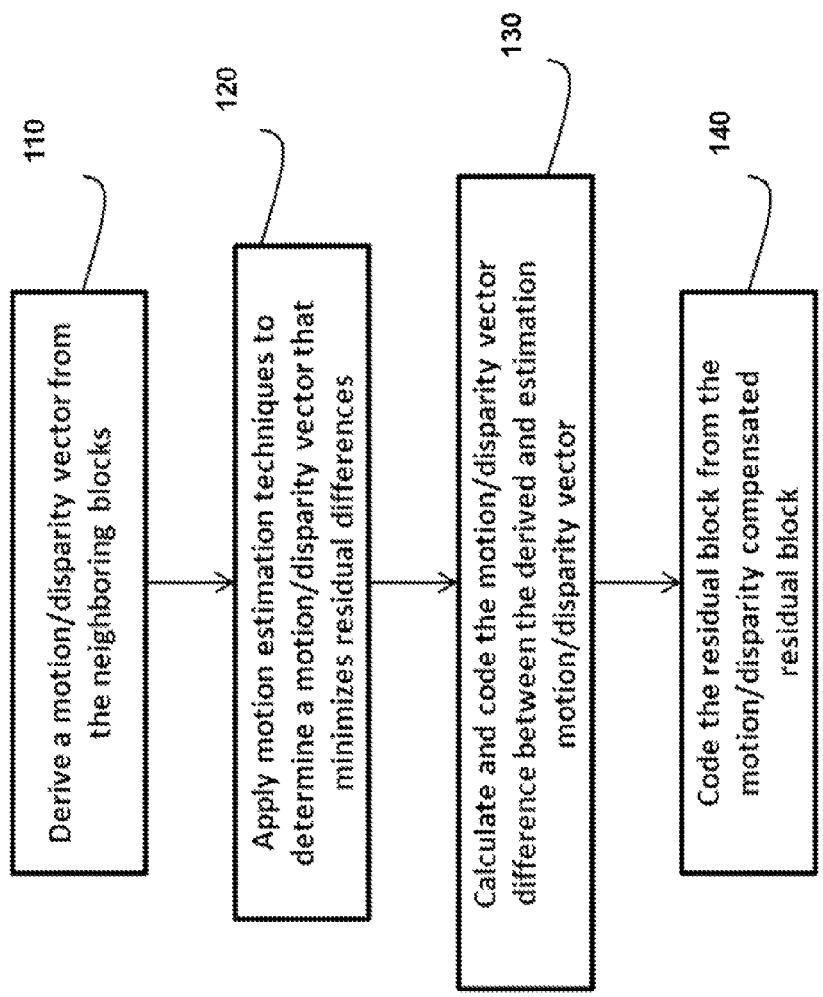
FIG. 1 is a flowchart of prior-art method that uses neighboring motion information to code motion information of a current block.
Figure 2:
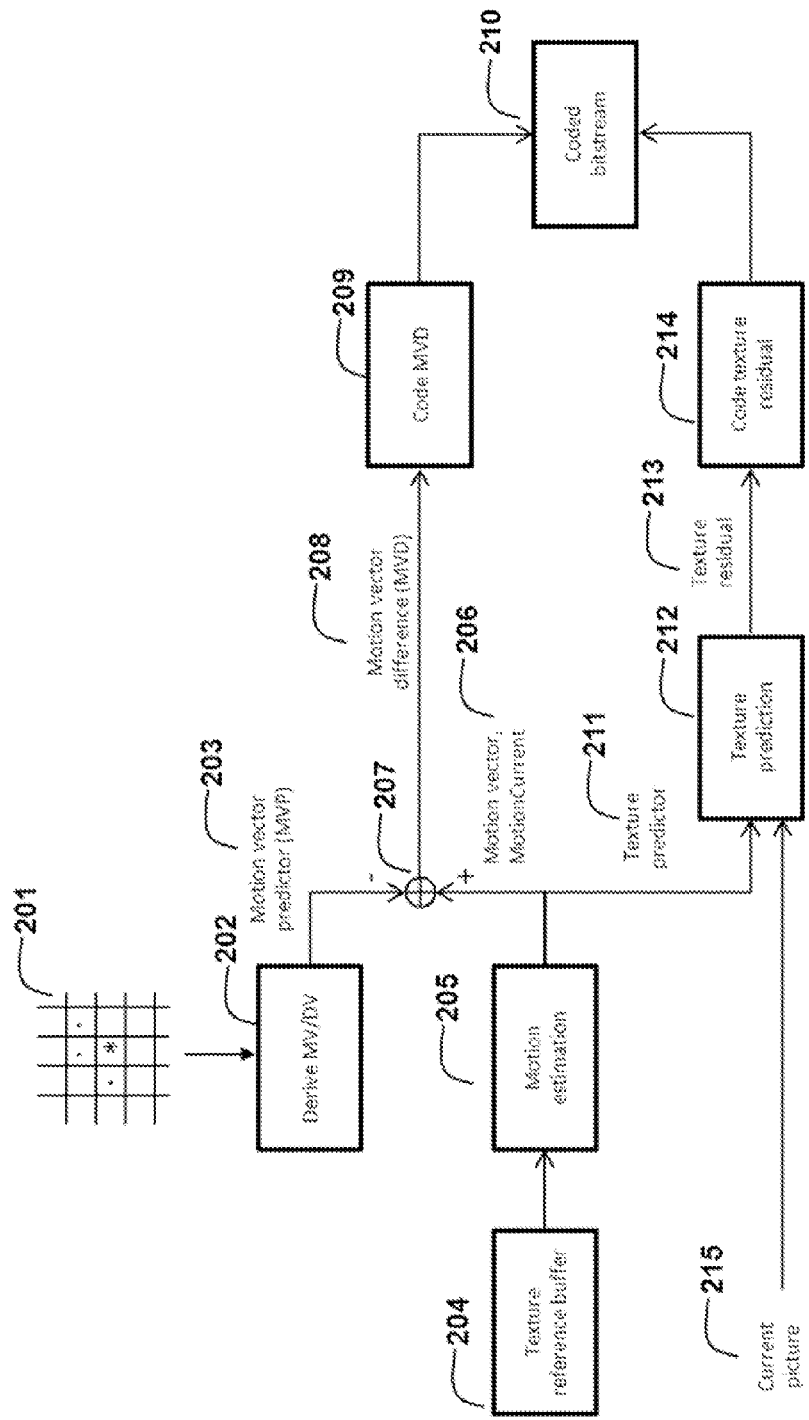
FIG. 2 is a block diagram of prior-art encoder.
Figure 3:
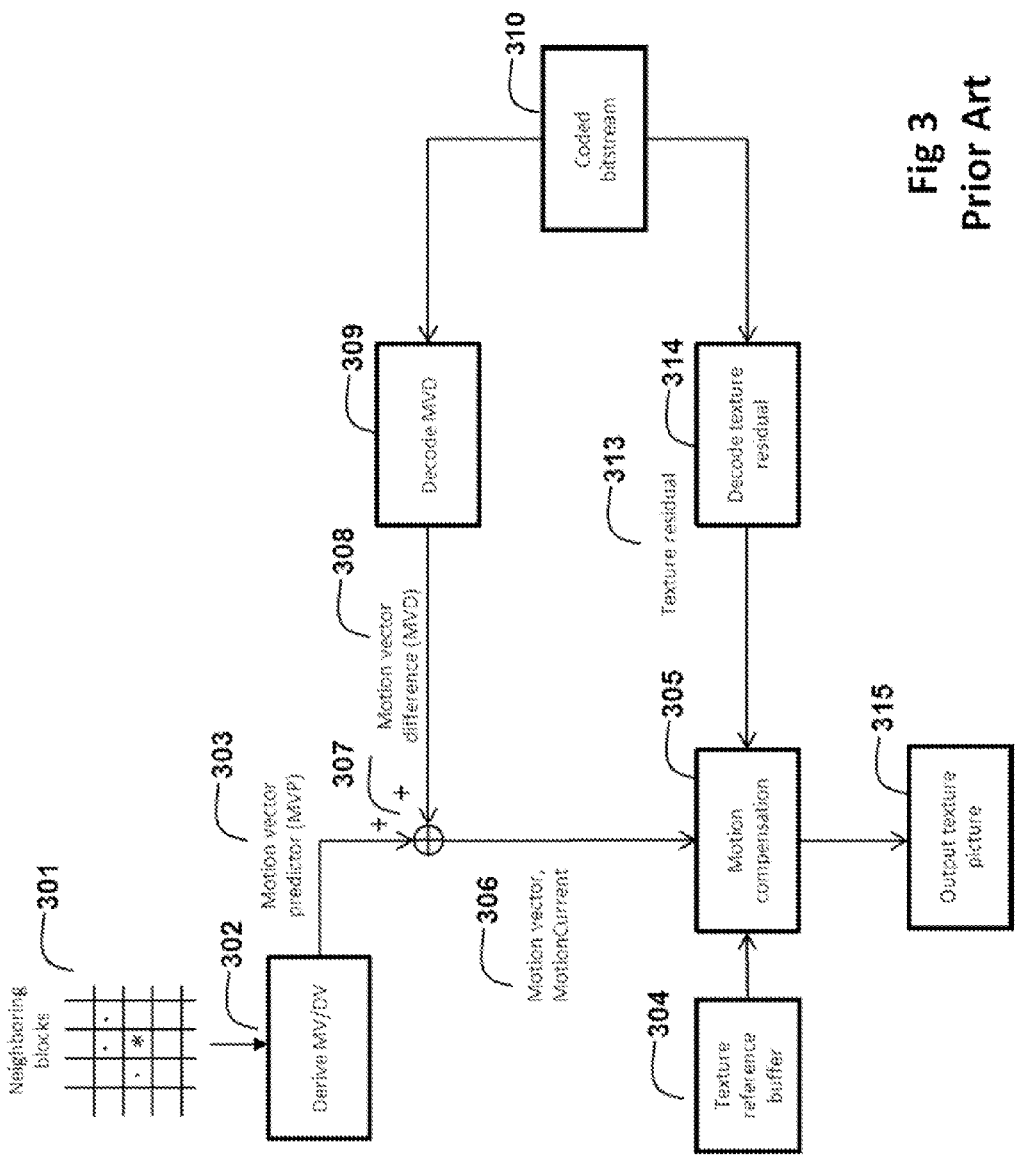
FIG. 3 is a block diagram of prior-art decoder.
Figure 4:
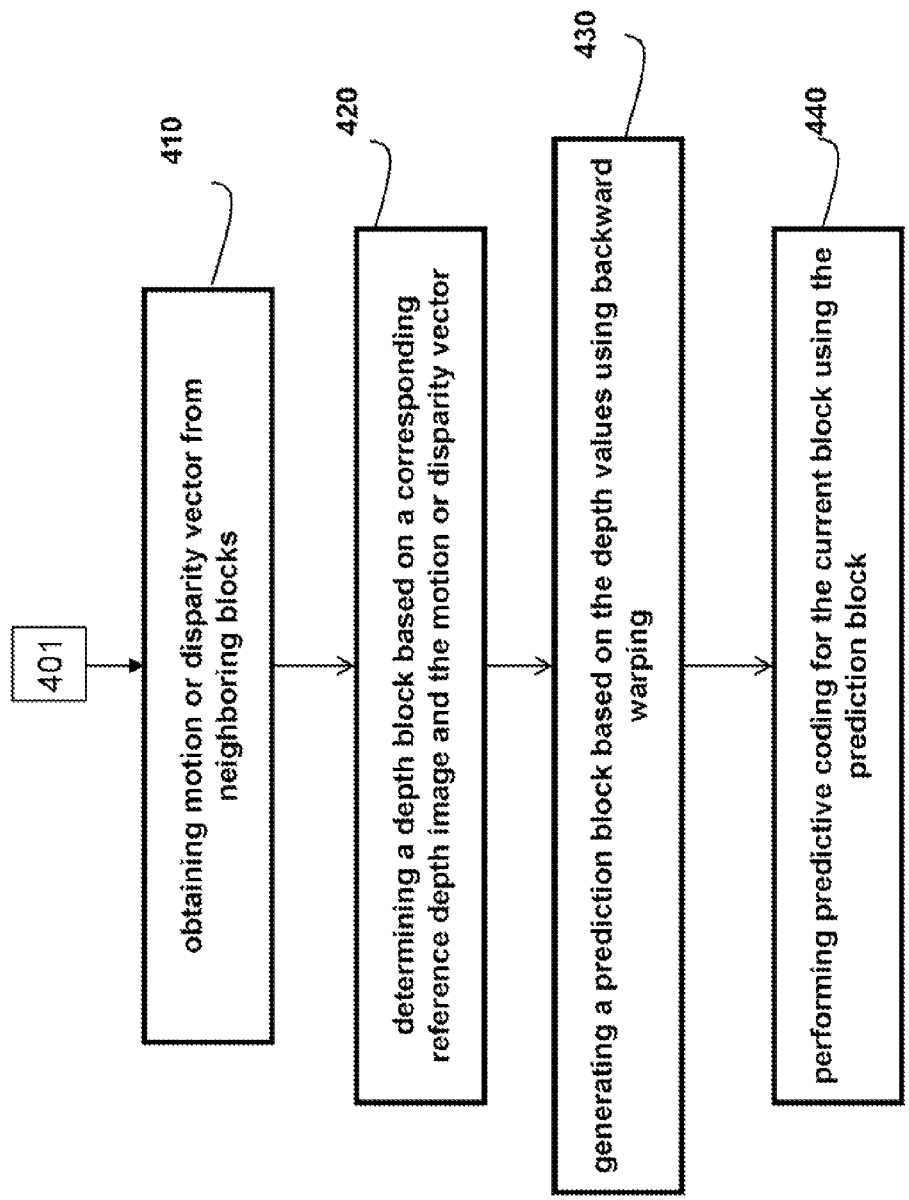
FIG. 4 is a flowchart of a method that uses neighboring motion or disparity information to code a current block with backward VSP prediction according to embodiments of the invention.

FIG. 4 shows a method for coding according to embodiments of invention. The steps are performed for each current block 401.

Step 410, obtaining motion or disparity vector from neighboring blocks.

Step 420, determining a depth block based on a corresponding reference depth image and the motion or disparity vector.

Step 430, generating a prediction block based on the depth values using backward warping; and Step 440, performing predictive coding for the current block using the prediction block.

Figure 5:
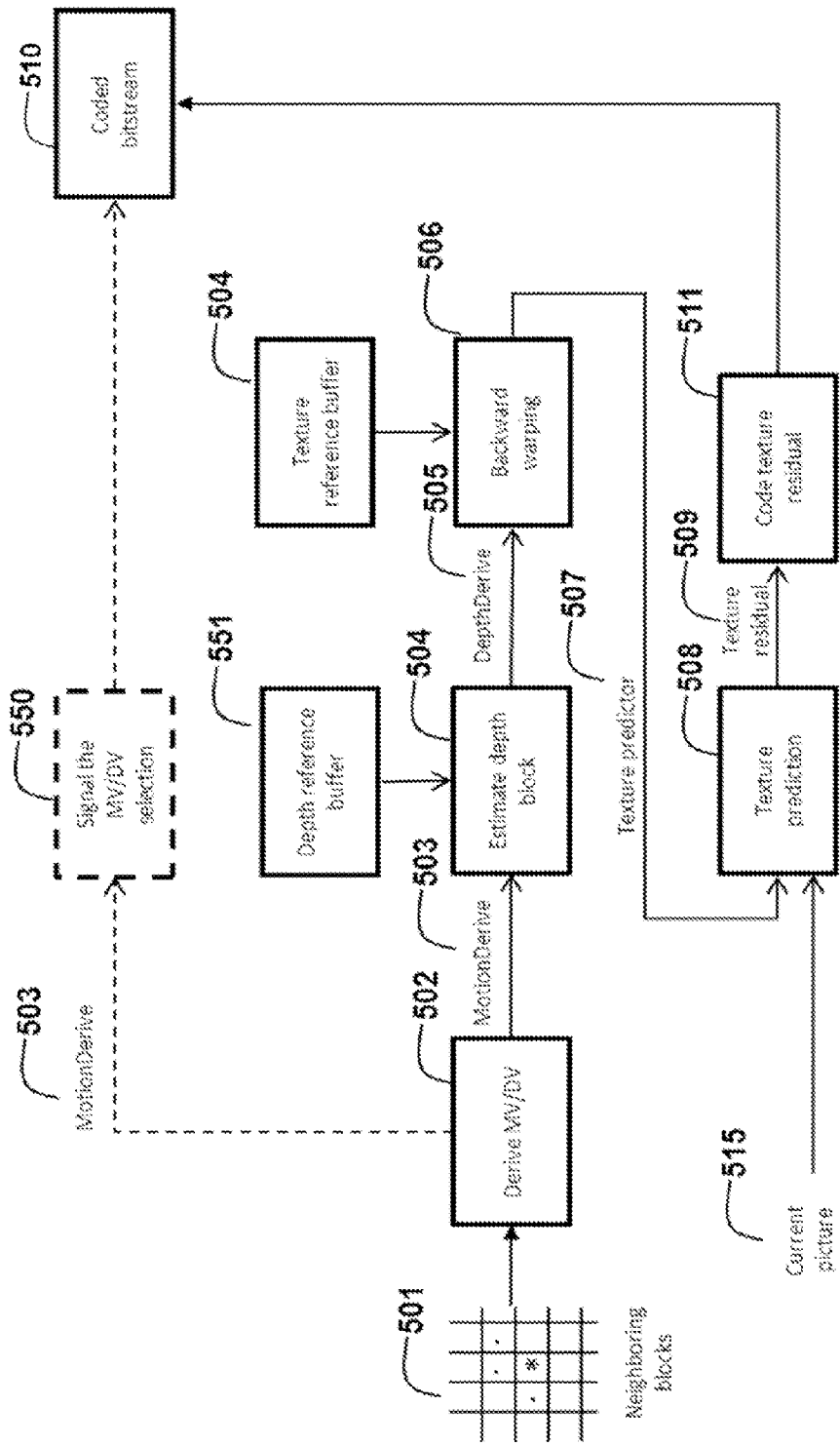
FIG. 5 is a block diagram of an encoder according to embodiments of the invention.

FIG. 5 shows a comparable encoder block diagram. From the neighboring blocks shown in element 501, derive 502 a motion vector or disparity vector MotionDerive (MVP) 503. Optionally, MotionDerive or side information that would assist the decoder to determine MotionDerive can be coded and signaled 550, and is part of the coded bitstream 510.

By referencing the depth reference picture buffer 551 using MotionDerive, a depth block DepthDerive 505 is estimated 504 for the current block.

By referencing the texture reference picture buffer 504 using DepthDerive, a backward warping is performed 506 to obtain a texture predictor 507.

Then, texture prediction 508 obtains the texture residual 509 based on the texture predictor 507 and the current picture 515, which is encoded 511 into the bitstream.

Figure 6:
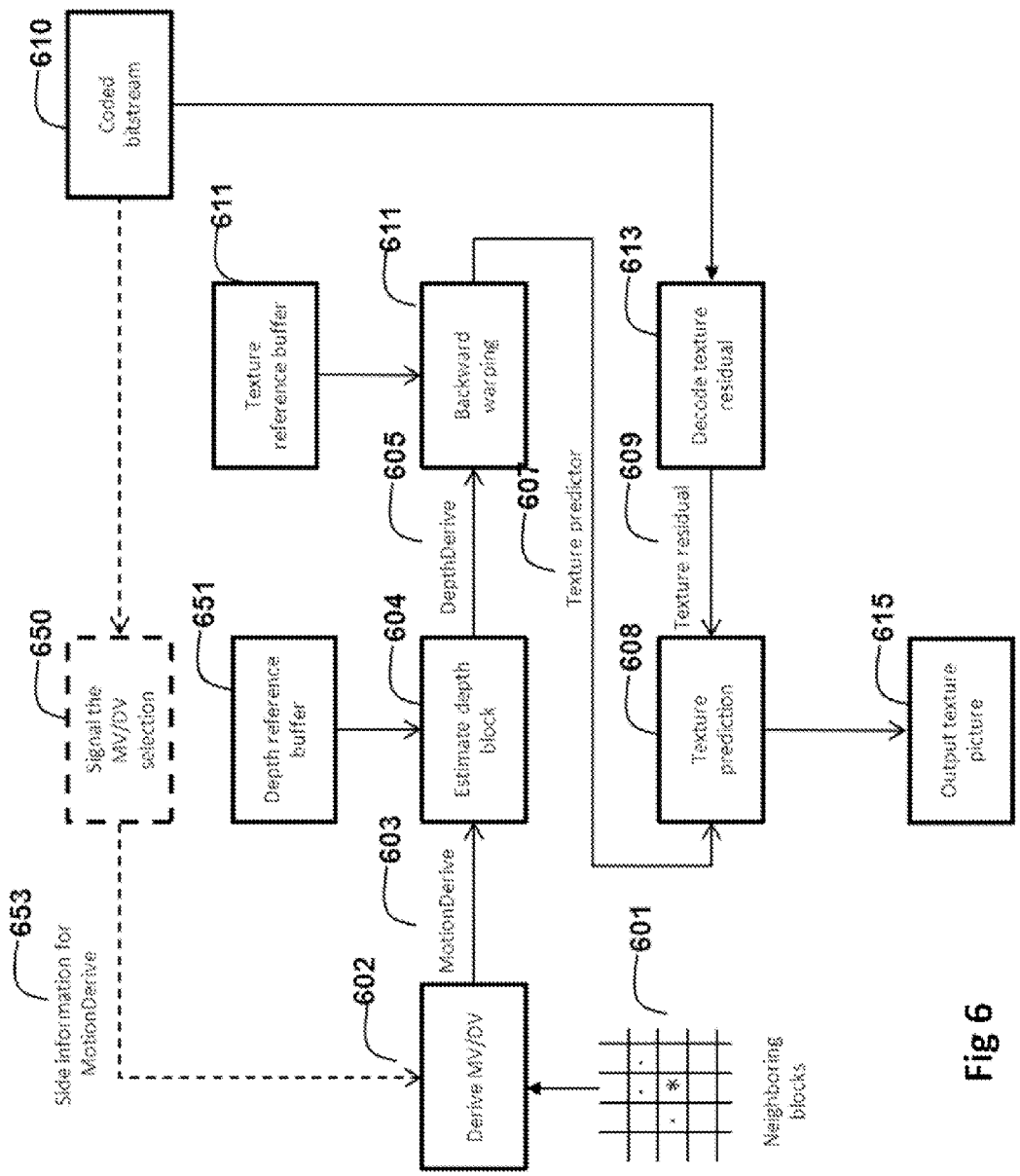
FIG. 6 is a block diagram of a decoder according to embodiments of the invention.

FIG. 6 shows the decoder. From the coded bitstream 610, side information 653 to derive motion or disparity vector selection may be signaled 650. If the side information 653 is being used, it is fed to block 601 as an input.

From the neighboring blocks as shown in element 601, derive 602 a motion vector or disparity vector Motion Derive 603.

By referencing the depth reference picture buffer 651 using MotionDerive, a depth block DepthDerive 605 is estimated 604 for the current block.

By referencing the texture reference picture buffer 611 using DepthDerive, a backward warping 612 is performed 606 to obtain a texture predictor 607.

From the coded bitstream, the texture residual 609 is decoded 613 to obtain the texture predictor 607 and texture residual 609 for texture prediction 608 to output the decoded texture picture 615.

The technique used by the embodiments can be referred to as depth compensated prediction, in contrast to motion or disparity compensated prediction, as in the prior art.

We describe three embodiments that use different pictures and depths available from a reference picture.

Embodiment 1

Anchor Picture, Depth from Reference Views are Available

In this embodiment, we assume that texture and depth components from a reference picture are both coded before the current texture and depth. E.g., the coding order for the two view case is T0D0T1D1, where T and D represents the texture and depth, and 0 and 1 represent two views. Note, the texture and depth from view 0 are coded before the texture and depth for view 1.

For anchor pictures, all blocks are either coded in Intra modes or Inter-view prediction in odes. In one example, there are three neighboring blocks for the current block, which are at the left (A), top (B) and top-right (C). The description can be easily expanded to use additional neighboring blocks.

If the neighboring blocks (A, B and C) are coded in Inter-view prediction modes, then each block is associated with a disparity vector, denoted by DisparityA, DisparityB and DisparityC.

Considering the similarity between the current block and the neighboring blocks, a disparity vector for the current block can be derived from the neighboring blocks, denoted by DisparityDerive. In one implementation, a. DisparityDerive=Mean (Disparity, DisparityB, DisparityC).

In another implementation, the derivation can be signaled as for merging a candidate list and index as defined in the emerging HEVC standard. That is, we construct a candidate list from the neighboring blocks. Then, an index is signaled in the bitstream to indicate the specific candidate used for DisparityDerive.

With DisparityDerive, a depth block DepthDerive in the depth image from the reference view can be identified and accessed. We use DepthDerive to do the backward warping for the current block.

The general process uses the neighboring blocks are described as above when the neighboring blocks are all coded using Inter-view prediction modes. Below, we describe the cases when a neighboring block is not coded in any Inter-view prediction modes.

If the neighboring block is coded in intra mode, then the corresponding disparity vector is zero.

If the neighboring block is coded using VSP prediction modes, then a single vector is not used for the entire block. Instead, in that case, a disparity vector can be determined from the depth block used for its VSP prediction. The disparity vector can be the average value of the entire depth block, or giving more weights to the depth pixels that are nearer to the current block.

Above, we first derive the disparity vector DisparityDerive and then use a single disparity to access the depth block DepthDerive. Alternatively, we can use multiple derived disparities, and thus, multiple derived depth blocks. The multiple derived depth blocks are determined according to a weighted average to obtain a single depth block to be used for the backward warping.

Figure 7:
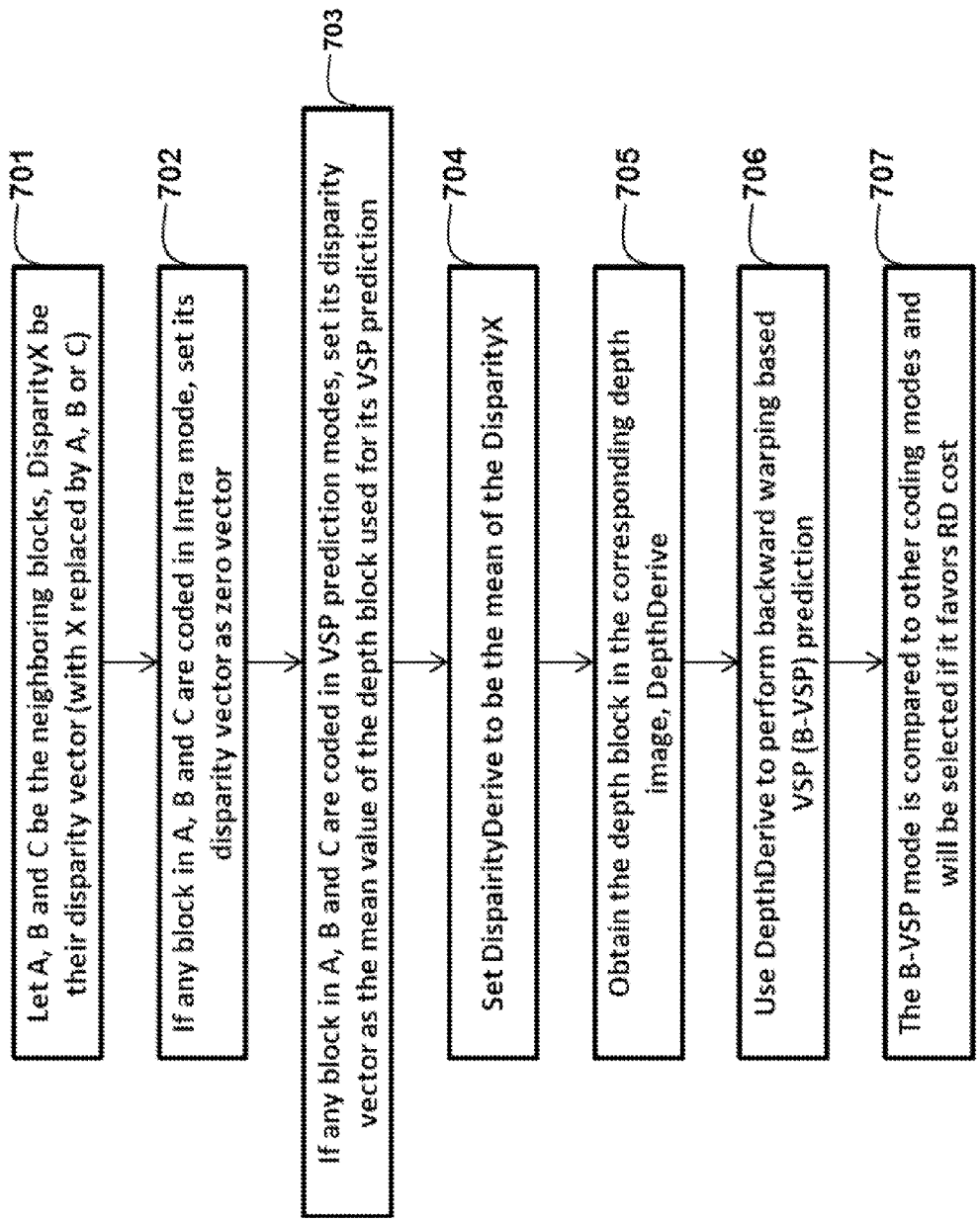
FIG. 7 is a flowchart of an encoding method according to embodiments of the invention.

FIG. 7 shows the encoding process for a block in an anchor picture using the B-VSP as a candidate coding mode.

Step 701, Let A, B and C be the neighboring blocks. DisparityX be their disparity vector (with X replaced by A, B or C).

Step 702, If any block in A, B and C are coded in Intra mode, set its disparity vector to zero.

Step 703, If any block in A, B and C are coded in VSP prediction modes, then set its disparity vector as the mean value of the depth block used for its VSP prediction.

Step 704, Set DisparityDerive to be the mean of the DisparityX.

Step 705, Obtain the depth block in the corresponding depth image, DepthDerive.

Step 706, Use DepthDerive to perform backward warping based VSP.

Step 707, The B-VSP mode is compared to other coding modes and is selected if the rate distortion cost is less.

Figure 8:
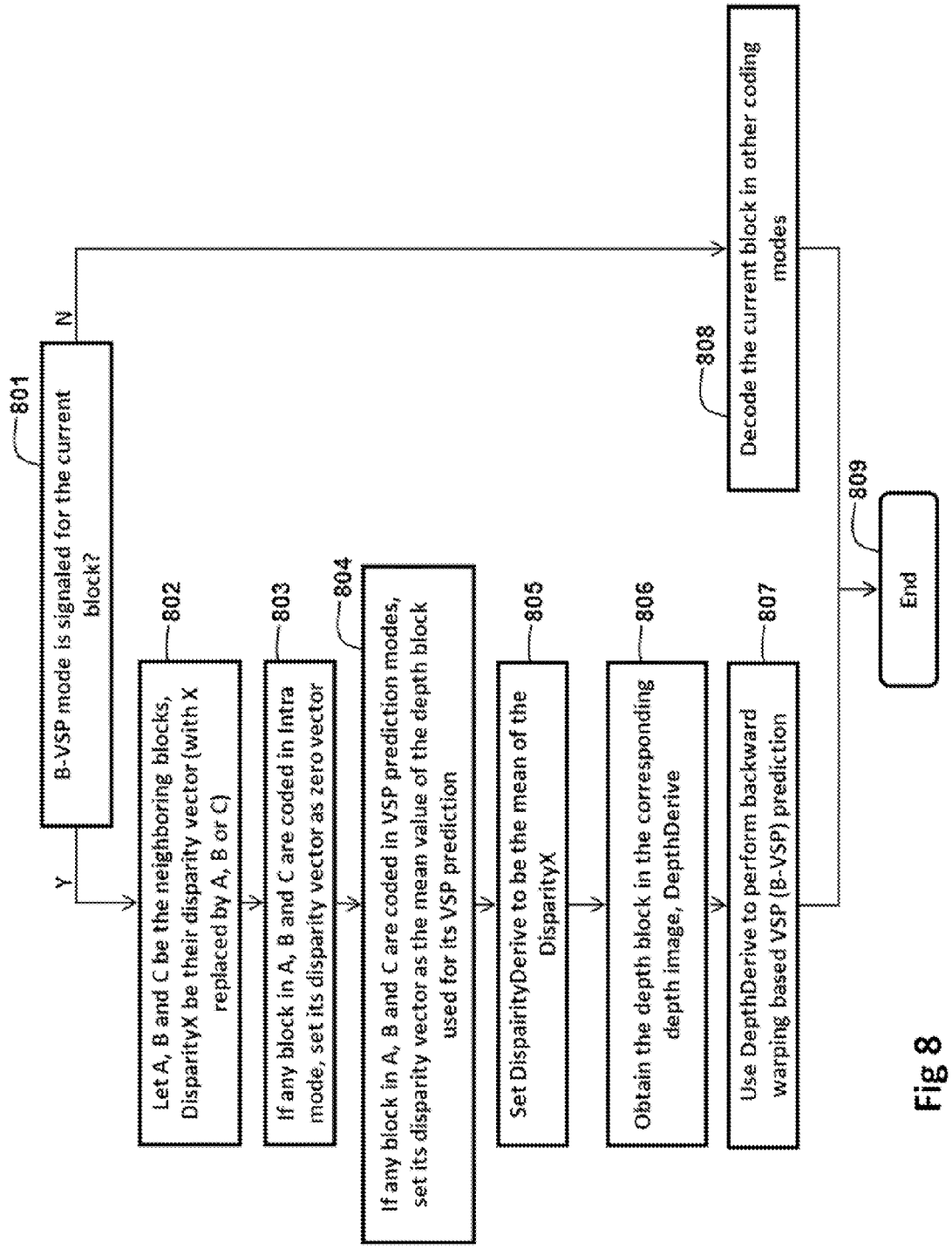
FIG. 8 is a flowchart of a decoding method according to embodiments of the invention.

FIG. 8 is the decoding process of a block in an anchor picture that uses the proposed B-VSP mode.

Step 801, Check if B-VSP mode is signaled for the current block. If yes, go to Step 802. Otherwise, go to Step 808.

Step 802, Let A, B and C be the neighboring blocks, DisparityX be their disparity vector (with X replaced by A, B or C).

Step 803, If any block in A, B and C are coded in Intra mode, then set the disparity vector to zero.

Step 804, If any block in A, B and C are coded in VSP prediction modes, then set its disparity vector as the mean value of the depth block used for its VSP prediction.

Step 805, Set DisparityDerive to be the mean of the DisparityX.

Step 806, Obtain the depth block DepthDerive in the corresponding depth image.

Step 807, Use DepthDerive to perform backward warping based VSP. Go to Step 809.

Step 808, Decode the current block in other coding modes.

Step 809, End of the procedure.

Embodiment 2

Anchor or Non-Anchor Picture, Depth from Reference Views are not Available

In this embodiment, we assume that all the texture components in an access unit are coded before all the depth components. E.g., the coding order for the two view case is T0T1D0D1, where both the texture from view 0 and view 1 are coded before depth. This embodiment can also apply when there is no texture dependency on the coding of depth.

In a similar process, the disparity DisparityDerive can be derived from the neighboring blocks. However, because depth data are not available for referencing, a per-pixel depth block cannot be accessed. Instead, we interpolate a depth block using the disparities DisparityA, DisparityB and DisparityC. In this embodiment, a linear interpolation is being used. Other interpolations can also be used.

Figure 9:
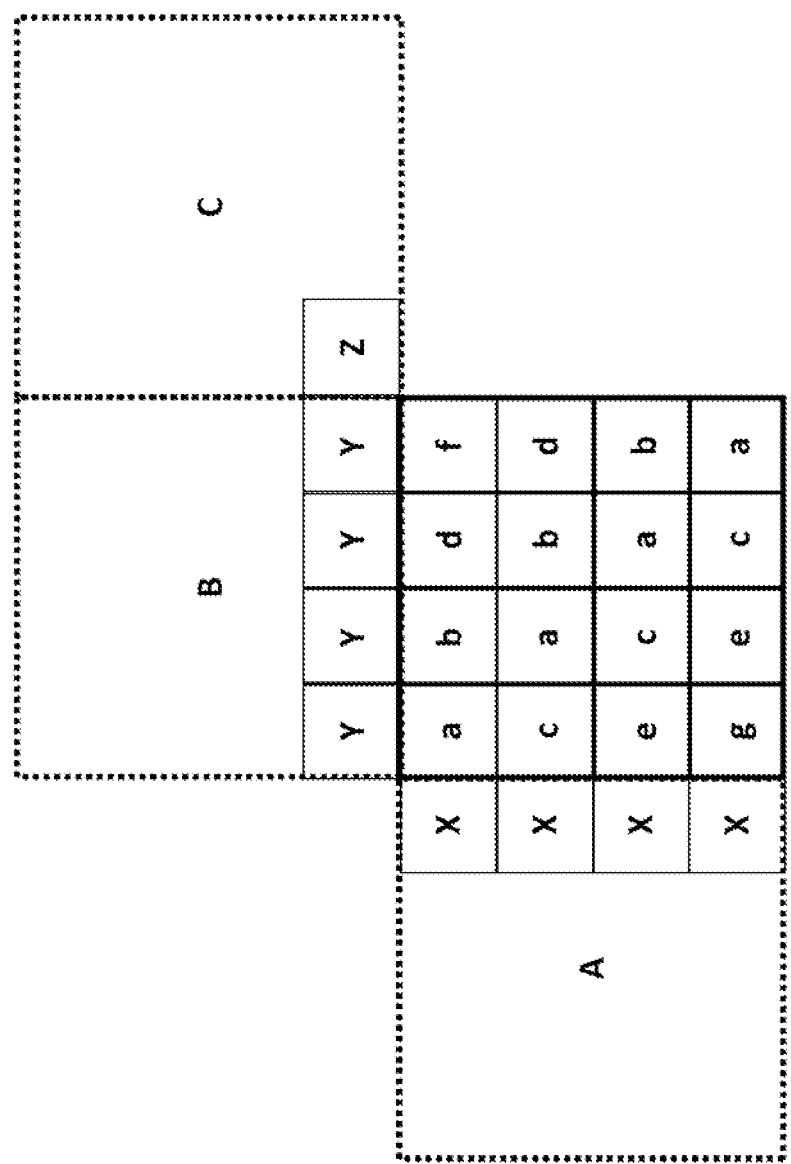
FIG. 9 is an example to estimate the depth values from neighboring blocks according to embodiments of the invention.

FIG. 9 shows an example interpolation, where a single depth value (X, Y and Z) for a neighboring block (A, B and C) are set from their disparity value DisparityA, DisparityB and DisparityC. The depth values for the current 4×4 block are interpolated as follows:

$a=(X+Y)/2;$ $b=(X+2*Y)/3;$ $c=(2*X+Y)/3$ $d=(X+3*Y)/4;$ $e=(3*X+Y)/4;$ $f=(X+4*Y)/5;$ and $g=(4*X+Y)/5,$ where a, b, c, d, e, f, and g are pixels in the current block. In the above implementation, the depth value Z from block C is not used. The depth value that is nearer to the pixel to be interpolated is given more weights. Other interpolation methods are possible to fill the depth block.

In addition, the depth value from a neighboring block can vary when the block is coded using B-VSP modes. In that case, the interpolation process for each pixel can be different.

Figure 10:
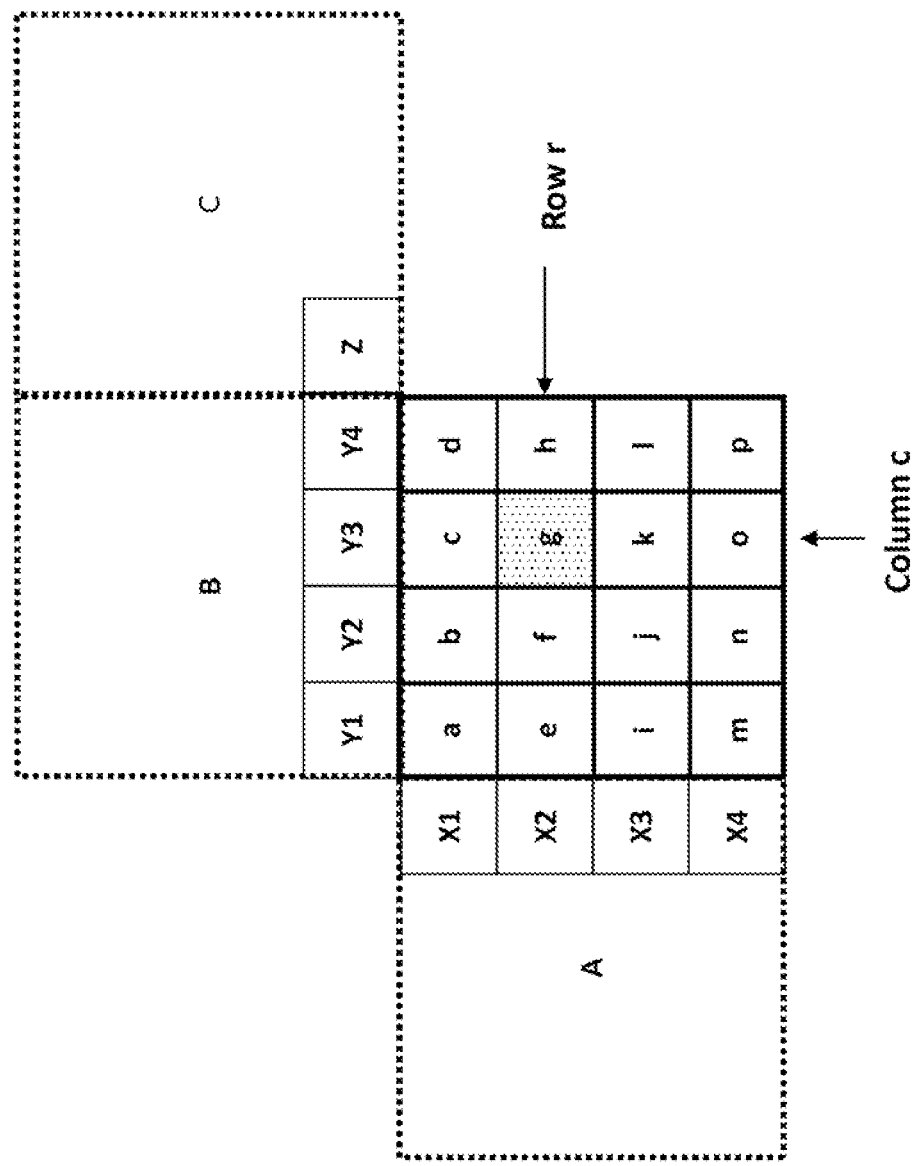
FIG. 10 is another example to estimate the depth values from neighboring blocks according to embodiments of the invention.

In one example, as shown in FIG. 10, the depth value of pixel at row r and column c, (r, c) can be interpolated as $Depth(r,c)=(Xc+Yr)/2.$ Embodiment 3

Non-Anchor, Depth from Reference Views are Available

For non-anchor pictures, it is more likely that the neighboring blocks use temporal prediction, other than inter-view prediction modes. However, it is not necessary to differentiate temporal prediction and inter-view prediction. Instead, in this embodiment, the associated reference texture of the motion or disparity vector has an available corresponding depth reference picture. Otherwise, the case is applied as described for Embodiment 2.

As in Embodiment 1, the motion or disparity vectors from neighboring blocks are used to derive a motion or disparity vector, which is used to identify and access a depth block from the corresponding reference depth image.

If a neighboring block is coded in Intra mode, then a zero disparity vector relative to the inter-view reference is used, rather than a zero motion vector relative to the temporal reference, when there is no mechanism in the bitstream to signal the neighboring block to be used to derive the motion or disparity vector. Otherwise, when there is a candidate list, an index mechanism is implemented. We add both zero disparity vector and a zero motion vector to the candidate list when there is an Intra coded neighbor block. Then, the encoder selects the optimal candidate based on the rate distortion cost.

Embodiment 4

Backward Warping Based VSP for Depth Image

The above embodiments are also applicable to code the depth picture from a dependent view. It is impossible to implement a backward warping based VSP prediction for depth in the conventional VSP because the depth image is required to do backward warping. Our embodiments do not require the current block.

Unlike the above embodiments, where the motion or disparity vectors of the neighboring blocks are utilized to get a depth block to do backward VSP, we use the sample values of the neighboring block to estimate a depth block. Because the current picture is a depth image, the neighboring blocks have per-pixel depths. It is more accurate to use the sample values, instead of the block level motion or disparity vector of those blocks to determine out the depth block to do B-VSP.

Figure 11:
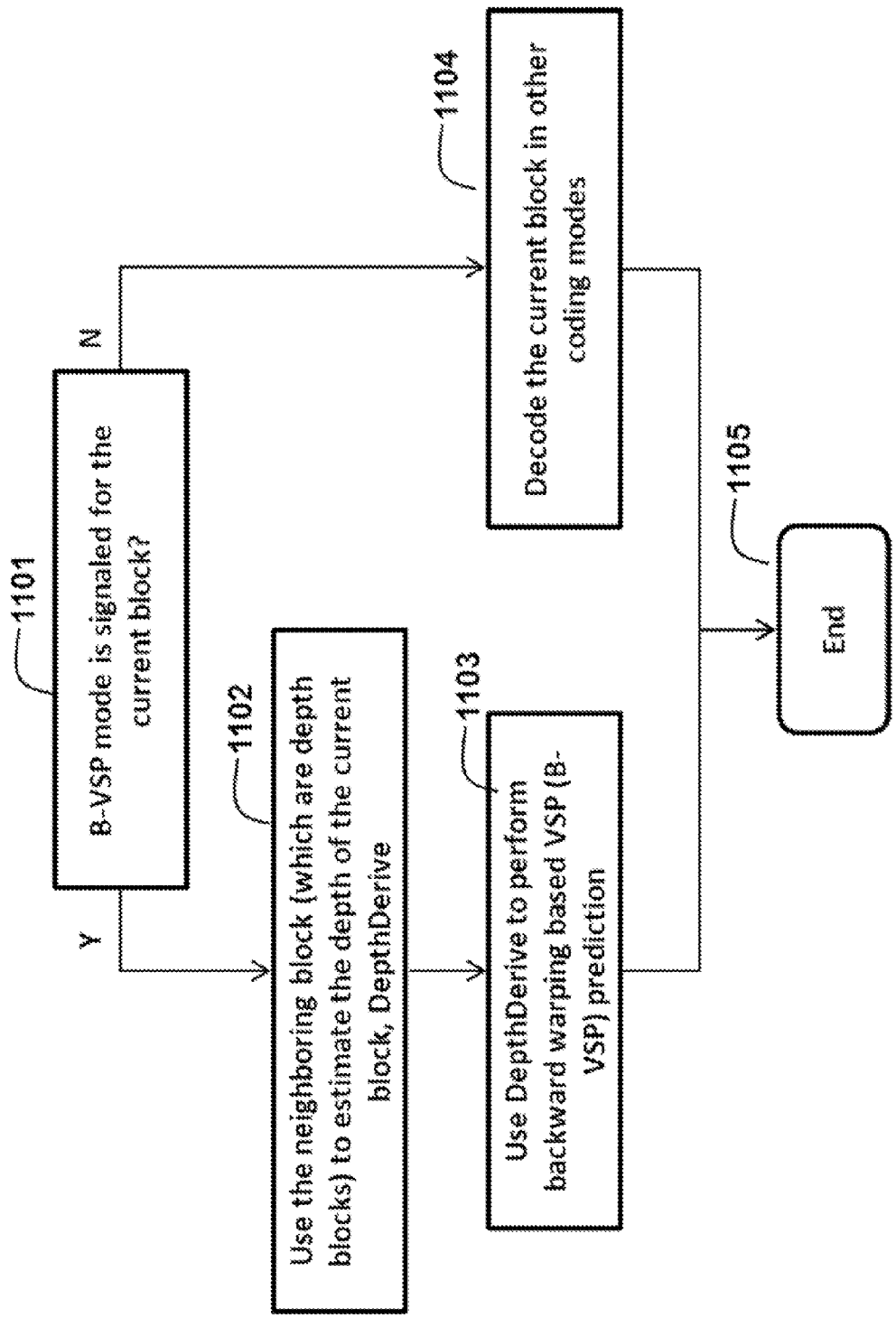
FIG. 11 is a flowchart showing the decoding process of a block in a depth anchor picture using the B-VSP mode according to embodiments of the invention.

FIG. 11 shows the corresponding decoding. The difference from the embodiment shown in FIG. 8 is that the motion or disparity vectors from neighboring blocks are not used.

Step 1101, Check if B-VSP mode is signaled for the current block. If yes, go to Step 1102. Otherwise, go to Step 1104.

Step 1102, Use the neighboring block (which are depth blocks) to estimate the depth DepthDerive of the current block.

Step 1103, Use DepthDerive to perform backward warping based VSP. Go to Step 1105.

Step 1104, Decode the current block in other coding modes.

Step 1105, End of the procedure.

Effect of the Invention

Conventional, forward warping based view synthesis prediction typically uses the texture and depth components from a reference view. The forward warping normally provides a high fidelity at a higher cost. In contrast, our view synthesis prediction uses backward warping for texture-coding, and does not require the depth component to be coded before the texture component. In addition, backward warping based VSP facilitates block based VSP reference generation, which is less complex and has implementation advantages.

To enable backward warping based VSP, while avoiding the depth-first coding, the invention uses a motion or disparity vector from neighboring blocks to derive a depth block from previously coded depth images, such as those depth images coded in the previous access unit, or the same access unit but from other viewpoints.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for processing one or more videos of a 3D-scene, in which each video is acquired by a corresponding camera arranged at a particular pose, comprising for each current block in a current picture to be processed the steps of:

obtaining a motion vector from neighboring blocks of the current block, wherein the neighboring blocks and the current block are for a same view;

determining a depth block from a corresponding depth component of a reference picture based on the motion vector for the current block;

synthesizing, using backward warping, a prediction block corresponding to a current view based on a reference picture corresponding to a reference view and the depth block corresponding to the current view; and combining, for the current block, the prediction block and a decoded residual block to produce a block of an output picture, wherein the steps are performed in a decoder.

2. The method claim 1, wherein the steps are performed in an encoder.

3. The method of claim 1, wherein texture and depth components from a reference picture are coded before the texture and depth components from the current picture.

4. The method of claim 1, wherein texture components of all views are coded before the depth components from the current picture.

5. The method of claim 1, wherein the motion vector is derived from a mean of motion information in the neighboring blocks.

6. The method of claim 1, wherein the motion vector is obtained based on side information signaled in a bitstream.

7. The method of claim 6, wherein the side information is an index to a candidate list of motion vectors.

8. The method of claim 1, wherein the depth block is based on a weighted average of multiple depth blocks.

9. The method of claim 2, wherein the encoding is based on rate and distortion cost.

10. The method of claim 1, wherein the current picture is a texture component.

11. The method of claim 1, wherein the current picture is a depth component.

12. The method of claim 1, wherein the motion vector is used for coding the neighboring blocks.

13. The method of claim 1, wherein the motion vector is calculated based on pixel values in the neighboring blocks.

14. The method of claim 1, wherein the derived depth block is interpolated directly from the motion vectors of the neighboring blocks.

15. The method of claim 1, wherein the processing is used in a 3D-video application.

16. The method as in claim 1, wherein which the motion vector is associated with a reference picture acquired from a different time.

17. The method as in claim 1, wherein which the motion vector is associated with a reference picture from another view point.

* * * * *